United States Patent
Engel et al.

(10) Patent No.: US 10,055,878 B2
(45) Date of Patent: Aug. 21, 2018

(54) METHOD OF VISUALIZING A THREE-DIMENSIONAL OBJECT FROM A DATA VOLUME

(71) Applicant: Siemens Healthcare GmbH, Erlangen (DE)

(72) Inventors: Klaus Engel, Nuremberg (DE); Jana Martschinke, Bubenreuth (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 73 days.

(21) Appl. No.: 15/252,436

(22) Filed: Aug. 31, 2016

(65) Prior Publication Data

US 2018/0061111 A1    Mar. 1, 2018

(51) Int. Cl.
*G06T 15/06* (2011.01)
*G06T 15/08* (2011.01)
*G06F 12/0897* (2016.01)
*G06F 12/0875* (2016.01)

(52) U.S. Cl.
CPC .......... *G06T 15/06* (2013.01); *G06F 12/0875* (2013.01); *G06F 12/0897* (2013.01); *G06T 15/08* (2013.01); *G06F 2212/455* (2013.01); *G06T 2207/10081* (2013.01); *G06T 2207/10088* (2013.01); *G06T 2207/10104* (2013.01); *G06T 2207/10108* (2013.01); *G06T 2207/10132* (2013.01); *G06T 2207/20024* (2013.01)

(58) Field of Classification Search
None
See application file for complete search history.

(56) References Cited

U.S. PATENT DOCUMENTS

2014/0375659 A1* 12/2014 McGuire ................ G09G 5/363
                                                              345/520
2017/0294042 A1* 10/2017 Engel .................... G06T 15/506

FOREIGN PATENT DOCUMENTS

WO   WO-2016045701 A1   3/2016

* cited by examiner

*Primary Examiner* — Michelle Chin
(74) *Attorney, Agent, or Firm* — Harness, Dickey & Pierce, P.L.C.

(57) ABSTRACT

A method of visualizing a three-dimensional object from a data volume is disclosed. In an embodiment, the method includes computing an irradiance cache for the data volume; and applying the irradiance cache during rendering of a three-dimensional image from the data volume. In an embodiment, entries of the irradiance cache are organized in a uniform grid.

33 Claims, 7 Drawing Sheets

METHOD OF VISUALIZING A THREE-DIMENSIONAL OBJECT FROM A DATA VOLUME

FIELD

At least one embodiment of the invention generally relates to a method of visualizing a three-dimensional object from a data volume.

BACKGROUND

For medical diagnostic purposes, volume data can be generated for example by a computer tomograph scanner or a magnetic resonance imaging scanner. Trained medical personnel can interpret the "image slices" and can explain their findings to a patient, for example, it may be desirable to explain a diagnosis or a planned surgical procedure to the patient.

To this end, in order to show the information contained in volume data in such a way that even an untrained person can identify elements of interest in the volume, it has been proposed in WO 2016/045701 A1 to apply a type of "cinematic rendering" to show the information as a "3D image", i.e. a two-dimensional view (shown on a computer monitor, for example) of the three-dimensional volume data, showing the object of interest in a very realistic manner. This technique allows the viewer to observe the three-dimensional "object" (for example the head, thorax, abdomen etc.) from any viewpoint or at any level of detail, and to clearly identify different elements such as bone, muscle, blood vessels, etc.

For this technique of cinematic rendering, Monte Carlo path tracing is applied over several iterations to render the volume data in a three-dimensional image for the chosen parameters. In this technique, many virtual paths are traced in a reverse manner, i.e. originating from pixels of the image plane and travelling through the volume. The colour and intensity of a pixel in the image plane is determined by a global radiance map (defining the direction, colour and brightness of a virtual light source directed at the image) and whether the traced paths (originating from that pixel) are absorbed in the volume, whether they pass through the volume, or whether they undergo volumetric scattering or surface scattering in the volume. A path can undergo several scatter events before leaving the volume, being absorbed by the volume, for example. The fate of each traced path is determined largely by properties of the data volume voxels such as their alpha values from the transfer function. Usually, a global transfer function assigns colour and opacity values to each voxel of the volume.

A user can interact with the rendered three-dimensional "object" to alter the point of view, the level of illumination, the type of tissue to be displayed, etc. For example, the user can switch from a frontal view to a side view; the user can switch between a view in which only bone is displayed to a view in which muscle and other tissue types are also shown, etc. However, changing one or more parameters leads to a problem on account of the progressive nature of the rendering algorithm. When one or more parameters are altered (e.g. changing the viewpoint to "rotate" the object being viewed), the image is initially very noisy.

The image quality only improves after carrying out successive iterations of the path tracing algorithm. However, during this time it is generally not possible to interpret the "noisy" image, particularly when the region of interest includes fine detail or complex structures. This problem can be addressed in a number of ways. For example, the image resolution can be decreased for the first few iterations, or appropriate pseudo-random numbers can be chosen when computing the paths. However, these techniques still suffer from a poor image quality until a sufficient number of iterations have been carried out, so that it is difficult or impossible to correctly interpret regions of the image during this time.

SUMMARY

At least one embodiment of the invention improves the quality of the rendered 3D images during such an interactive viewing.

At least one embodiment of the invention is directed to a method of visualizing a three-dimensional object from a data volume. At least one embodiment of the invention is directed to an imaging system.

According to at least one embodiment of the invention, the method of visualizing or rendering a three-dimensional object from a data volume comprises the steps of applying a path tracing technique to compute an irradiance cache (3D texture) for the data volume in a preparatory stage; and applying the irradiance cache during iterative rendering of a three-dimensional image from the data volume during an image rendering stage. The irradiance cache comprises a three-dimensional volume or matrix of irradiance cache voxels. In at least one embodiment of the inventive method, the irradiance cache comprises a plurality of levels, wherein an irradiance cache level provides the irradiance contribution for all paths with a specific number of remaining scatter events.

At least one embodiment of the invention can be carried out by a computer program product comprising a computer program that is directly loadable into a memory of a control unit of a computer and which comprises program elements for performing at least one embodiment of the inventive method when the computer program is executed by the control unit of the computer to render a three-dimensional image on a monitor connected to the computer.

According to at least one embodiment of the invention, the imaging system comprises an irradiance cache computation stage realized to perform path tracing to compute an irradiance cache for a data volume; and a rendering stage realized to applying the irradiance cache during rendering of a three-dimensional image from the data volume. The inventive imaging system is characterized in that the irradiance cache computation stage is realized to compute an irradiance cache comprising a plurality of levels, wherein an irradiance cache level provides the irradiance contribution of paths with a specific number of remaining scatter events.

BRIEF DESCRIPTION OF THE DRAWINGS

Other objects and features of the present invention will become apparent from the following detailed descriptions of example embodiments considered in conjunction with the accompanying drawings. It is to be understood, however, that the drawings are designed solely for the purposes of illustration and not as a definition of the limits of the invention.

In the diagrams, like numbers refer to like objects throughout. Objects in the diagrams are not necessarily drawn to scale.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to at least one embodiment of the invention, the method of visualizing or rendering a three-dimensional object from a data volume comprises the steps of applying a path tracing technique to compute an irradiance cache (3D texture) for the data volume in a preparatory stage; and applying the irradiance cache during iterative rendering of a three-dimensional image from the data volume during an image rendering stage. The irradiance cache comprises a three-dimensional volume or matrix of irradiance cache voxels. In at least one embodiment of the inventive method, the irradiance cache comprises a plurality of levels, wherein an irradiance cache level provides the irradiance contribution for all paths with a specific number of remaining scatter events.

In at least one embodiment, the rendering a 3D image comprises applying an iterative path tracing algorithm such as a Monte Carlo path tracing algorithm. Whenever a path is deemed to terminate in a surface scattering event, the irradiance value for the corresponding pixel is read from the irradiance cache. This "cache lookup" results in a significant saving in time during the image rendering stage.

An advantage of the imaging method according to at least one embodiment of the invention is that an irradiance cache can be computed with relatively little effort. When rendering the 3D image (also using a path tracing technique), an irradiance value for any path at any voxel of the volume can be retrieved as appropriate from the irradiance cache. In this way, significant reductions in computational effort can be achieved, while ensuring that the smoothness of the rendered image converges very quickly. Whenever a new 3D image is rendered, for example after changing the viewing direction, the previously computed irradiance cache is used in determining the colour of each pixel of the rendered image. Because the irradiance does not have to be computed anew each time a viewing parameter has changed, fewer iterations are required in the image rendering stage to achieve a high degree of smoothness. This means that even fine detail will be shown very quickly. The inventive method is an improvement over similar known techniques on account of the resource-efficient manner in which the irradiance cache is computed, as will be explained in more detail below.

At least one embodiment of the invention can be carried out by a computer program product comprising a computer program that is directly loadable into a memory of a control unit of a computer and which comprises program elements for performing at least one embodiment of the inventive method when the computer program is executed by the control unit of the computer to render a three-dimensional image on a monitor connected to the computer.

According to at least one embodiment of the invention, the imaging system comprises an irradiance cache computation stage realized to perform path tracing to compute an irradiance cache for a data volume; and a rendering stage realized to applying the irradiance cache during rendering of a three-dimensional image from the data volume. The inventive imaging system is characterized in that the irradiance cache computation stage is realized to compute an irradiance cache comprising a plurality of levels, wherein an irradiance cache level provides the irradiance contribution of paths with a specific number of remaining scatter events.

Here, stages of the imaging system can be organised as separate sub-stages should this be preferable owing to technical limitations such as processor runtime constraints. Of course, imaging system sub-stages could be combined as a single unit or module if such a realisation is technically feasible.

At least one embodiment of the inventive imaging system can be realised without any significant additional effort, since it makes use of computational resources that are required in any case. These computational resources are used more efficiently in the inventive imaging system.

Particularly advantageous embodiments and features of the invention are given by the dependent claims, as revealed in the following description. Features of different claim categories may be combined as appropriate to give further embodiments not described herein.

In the following, without restricting embodiments of the invention in any way, it may be assumed that the data volume is obtained from any of an X-ray computer tomograph, a magnetic resonance imaging tomograph, a positron emission tomograph, a single-photon emission computed tomograph, an ultrasound scanner.

As explained in the introduction, a technique of cinematic rendering allows a viewer to observe a three-dimensional object (3D image) from any viewpoint or at any level of detail, and to clearly identify different elements in the 3D image. In this technique, Monte Carlo path tracing is applied over several iterations to render the volume data in a three-dimensional image for certain chosen parameters such as an altered viewpoint, an altered zoom factor, an altered camera angle, etc. In this technique, many virtual paths are traced "in reverse" from the image plane through the volume. The colour and intensity of a pixel in the image plane is determined by a global radiance map and how the traced paths behave in the volume. The fate of each traced path is determined largely by properties of the data volume voxels such as their alpha values from the transfer function.

It is known that the quality of a 3D rendered image is vastly improved when the irradiance or diffuse lighting is taken into consideration. When the effects of both global and diffuse or indirect lighting are considered, objects in the image appear more vivid or tangible on account of the more realistic shadows and reflected light. However, it requires significant computational effort to compute the indirect lighting for an image.

At least one embodiment of the invention makes use of the insight that the irradiance is independent of viewing parameters such as the camera position, rotation and zoom. In a preferred embodiment of the invention, the irradiance cache is computed prior to an image rendering stage, and the same irradiance cache can be applied in the rendering of different images in an image sequence. Preferably, as explained above, the irradiance cache is computed by performing Monte Carlo path tracing through voxels of the data volume on the basis of volumetric scattering events. Each path may travel through a number of voxels, and the alpha values of those voxels are accumulated. A ray or path is deemed to undergo scattering when the accumulated alpha values exceed a predefined threshold. This scattering is rated as surface scattering (for example from bone) if a three-dimensional gradient value is large, otherwise it is seen as volumetric scattering. In a preferred embodiment of the inventive method, an irradiance cache value is computed only for a voxel whose gradient magnitude meets or exceeds a predefined threshold.

Cinematic rendering distinguishes between surface scatter events and volumetric scatter events. In at least one embodiment of the inventive method, the irradiance cache is computed to comprise a number of levels, wherein a specific cache level is associated with a number of volumetric scatter events that remain after occurrence of a scatter event. A path can undergo several volumetric scatter events, i.e. a path can change direction several times as it passes through the volume without meeting a surface, but only one single surface scatter event is permitted per path. A volumetric scatter event may occur as the path travels through a transmissive medium (such as soft tissue), while a surface scatter event may occur when the path meets a significant gradient (such as bone).

An irradiance cache value can only be computed for a path without surface scatter events, as a surface scatter event requires direct lighting computations that are view-dependent. Therefore, paths are traced during image rendering until a surface scatter event occurs. At this point, further path tracing can be omitted, and a previously computed irradiance value is looked up from the appropriate level of the irradiance cache and used instead.

As it cannot be predicted which scatter event will be a surface scatter event, in at least one embodiment of the inventive method the look-up values have been computed for different numbers of remaining (volumetric) scatter events, thereby covering each possible situation. As explained above, each level of the irradiance cache corresponds to a specific number of volumetric scatter events that are allowed to occur after a surface scatter event. For example, a maximum of four possible scatter events may be set for the paths to be traced during image rendering.

In at least one embodiment of the inventive method, three cache levels are computed, with a cache level providing irradiance information for the case that the first scatter event in a path is a surface scatter event (three scatter events remain); a cache level providing irradiance information for the case that the second scatter event of a path is a surface scatter event (two scatter events remain); and a cache level providing irradiance information for the case that the third scatter event of a path is a surface scatter event (one scatter event remains). During rendering of the image, a surface scatter event is followed by a lookup step to one of the irradiance cache levels to retrieve the appropriate irradiance value. The colour of the retrieved irradiance cache voxel is multiplied with the relevant colour from the global illumination map. The colour of a pixel is black for the case that a surface scatter event corresponds to the fourth possible scatter event.

At least one embodiment of the inventive method also makes use of another important insight: the irradiance at one voxel of the data volume will be similar to the irradiance at the close neighbouring voxels, i.e. the irradiance at one example voxel will be nearly identical to the irradiance at the twenty-six voxels surrounding that example voxel. In a particularly preferred embodiment of the invention, therefore, the resolution of the irradiance volume or irradiance cache comprises at most half, more preferably at most one quarter, of the resolution of the data volume. The data volume and the irradiance volume can be visualized spatially as equally large three-dimensional arrays of voxels.

In one example embodiment of the inventive method, one voxel of the irradiance cache supplies an irradiance value for each data volume voxel in a 3×3×3 array or "voxel block", so that each entry or voxel of the irradiance cache relates to the corresponding 27 voxels of the data volume. Similarly, one voxel of the irradiance cache might provide the irradiance value for each data volume voxel in a 4×4×4 array of the data volume, so that an irradiance cache voxel corresponds to 64 voxels of the data volume. Of course, other relationships are possible between the data volume and the irradiance volume.

As mentioned above, whenever a path is deemed to terminate in a surface scattering event during the image rendering stage, the irradiance value for the corresponding pixel is read from the irradiance cache. Multiple traced paths (which can originate from different pixels) that terminate at a single irradiance cache voxel will each receive that irradiance value, so that the "cache look-up" results in a significant saving in computational resources.

In a further preferred embodiment of the invention, the method comprises a step of filtering the irradiance cache. This step can serve to smoothen any significant differences in colour values between neighbouring irradiance cache voxels. Such differences may arise on account of the deliberately small number of paths traced for each irradiance cache voxel.

As already indicated, the previously computed irradiance cache can be re-used in rendering a new 3D image even after alteration of a parameter such as the viewpoint, the zoom factor, the camera angle, etc. Changing any one or more of these parameters has no effect on the irradiance or diffuse lighting for the images being rendered. However, other parameters may change during an interactive viewing procedure. For example, a doctor may decide to change the level of information being shown in a 3D image rendered from an MRT volume, CT volume etc., for example to "hide" muscle tissue so that bones and blood vessels may be more clearly seen. In other words, the transparency of particular voxels of the volume can be altered by the transfer function. Changing such a viewing parameter affects the behaviour of the paths as they are traced through the volume, so that the irradiance cache must be re-computed. In a preferred embodiment of the invention, therefore, the irradiance cache is re-computed upon alteration of one or more of a global illumination parameter, a voxel alpha value parameter, a voxel transfer function parameter, etc.

At least one embodiment of the inventive imaging system may comprise any suitable hardware components capable of running algorithms for the method steps described above. Generally, such an imaging system will comprise a graphics processing unit (GPU) as will be known to the skilled person. The GPU computations can be distributed over a number of fragment shaders or compute-shaders. For example, in a preferred embodiment of the invention a first compute-shader is preferably adapted to trace a path from each voxel block of the data volume to estimate a colour value for each entry of the irradiance cache; and a second compute-shader adapted to adjust an interim result of the irradiance volume computation module by the weighted result of the first compute-shader.

An irradiance cache with a high number of paths used for irradiance precomputation would be preferable, since this will allow an image to be rendered more realistically. However, a higher number of paths is directly related to computational effort and time, and the computational resources may not be available for this purpose. Therefore, in a preferred embodiment of the invention, an initial irradiance cache is computed, using only few traced paths per voxel. This "coarse" irradiance cache is then refined (by tracing more paths) while an image is being rendered. Irradiance cache refinement is performed for the same parameters, i.e. not following an interaction that would involve computation of a new irradiance cache. By using a coarse or less refined irradiance cache at the outset, the initial pre-processing time can be kept favourably short. The initial irradiance cache is improved or refined by inserting irradiance cache computation passes (for example, tracing one path per voxel in each pass) between image rendering passes. It is desirable to compute as many image frames as possible during an interactive rendering interval, which means that the GPU is busy during that time. By interleaving cache refinement steps with image rendering passes, it is possible to provide a high-quality irradiance cache without slowing down the interactive rendering.

Figure 1:
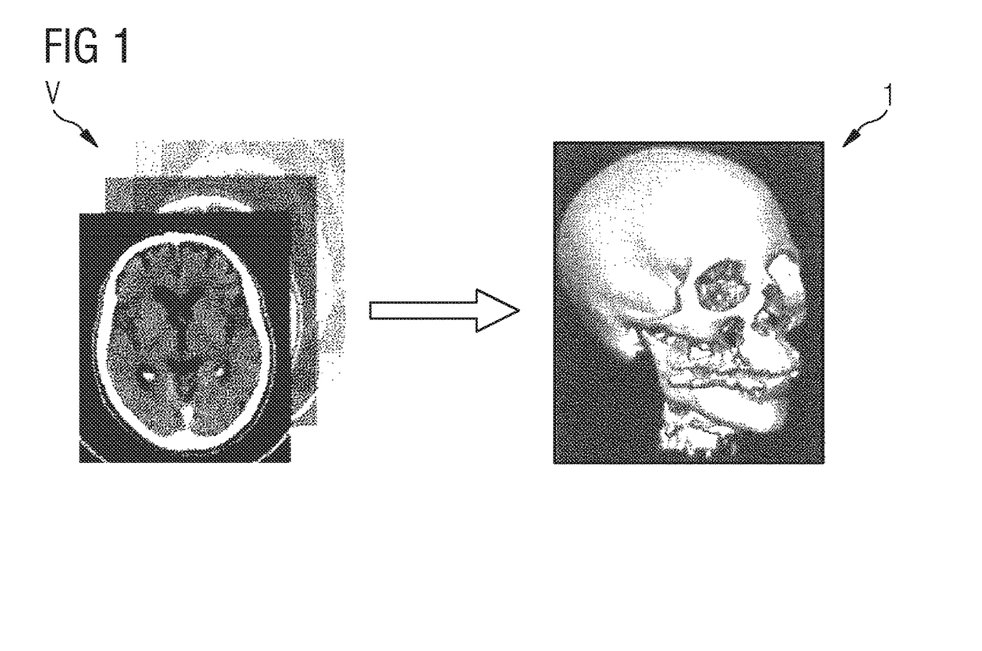
FIG. 1 shows a data volume and a corresponding rendered image.

FIG. 1 shows a data volume V and a corresponding rendered image 1. The data volume V is shown to comprise multiple image layers, in this case the layers were generated by X-ray computed tomography of a patient's head. A doctor or other trained medical personnel can interpret the images to detect anomalies such as a bone fracture, a tumour, an embolism etc., and/or to plan a surgical intervention. A patient would generally have difficulty interpreting or understanding the black-and-white layer images. However, it is important that the doctor or surgeon is able to explain his findings to the patient. Therefore, rendering algorithms have been developed to convert the layer images into a three-dimensional image showing the desired level of detail, for example the image 1 shown on the right has been rendered to the level of bone, leaving out all soft tissue. Different types of tissue can be shown in different colours, thereby making the rendered image easier to interpret by an untrained person.

Figure 2:
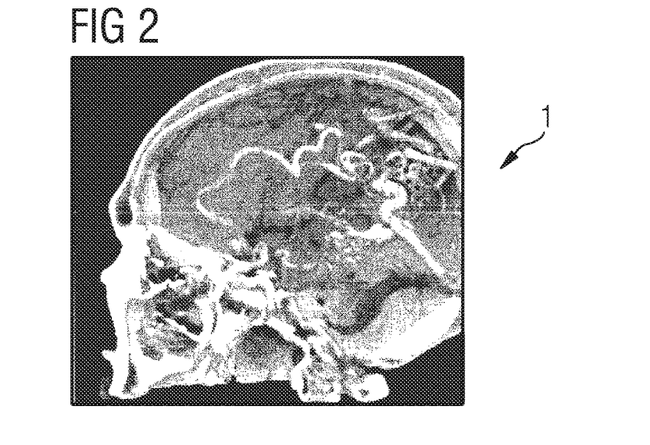
FIG. 2 shows an example result of cinematic rendering.

With the technique of cinematic rendering, such data volumes can be rendered to a very high degree of realism. The information contained in each voxel—defining its transparency, its transfer function etc.—defines whether that voxel belongs to bone, a specific tissue type, or empty space. FIG. 2 illustrates an example result of cinematic rendering, with the rendered image 1 showing the interior of a patient's skull with all major blood vessels. Only voxels with a transfer function relating to blood vessel or bone are shown in the image 1, all other voxels are treated as empty space. The level of detail and the realistic rendering can assist a doctor in explaining his findings to the patient.

In cinematic rendering, the user can alter the viewpoint, the zoom level, the virtual camera angle, etc. As explained above, each rendered image involves many iterations to fully define the objects shown and their illumination, so that any such parameter alteration is followed by an initially noisy image, which becomes progressively smoother with increasing iteration count.

Figure 3:
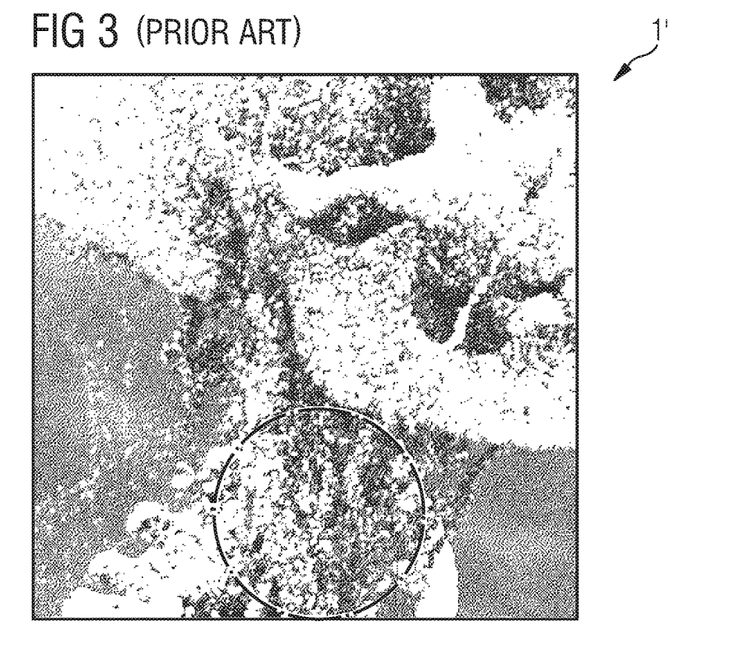
FIG. 3 shows an image during interactive prior art cinematic rendering.
Figure 4:
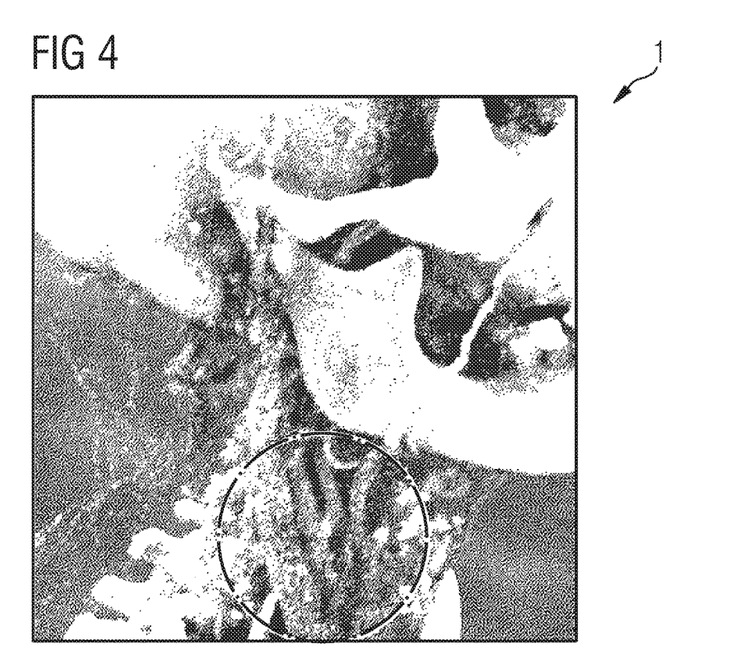
FIG. 4 shows an image during interactive cinematic rendering according to an embodiment of the invention.

FIG. 3 shows a noisy image 1' immediately following a parameter change during a prior art interactive cinematic rendering session. The image 1' in this example should show the throat region with larynx, vertebrae, lower skull and blood vessels. FIG. 3 clearly shows that much information is lost in the noisy image 1', making it impossible to identify any of the smaller details as indicated in the circled portion of the diagram. FIG. 4 shows the same volume data rendered by an embodiment of the inventive cinematic rendering method, immediately following the same parameter change. FIG. 4 clearly shows the advantage of using the previously computed irradiance volume to render the image 1. The image 1 is essentially noise-free and shows a satisfactorily high level of detail, as indicated in the circled portion of the diagram.

Figure 5:
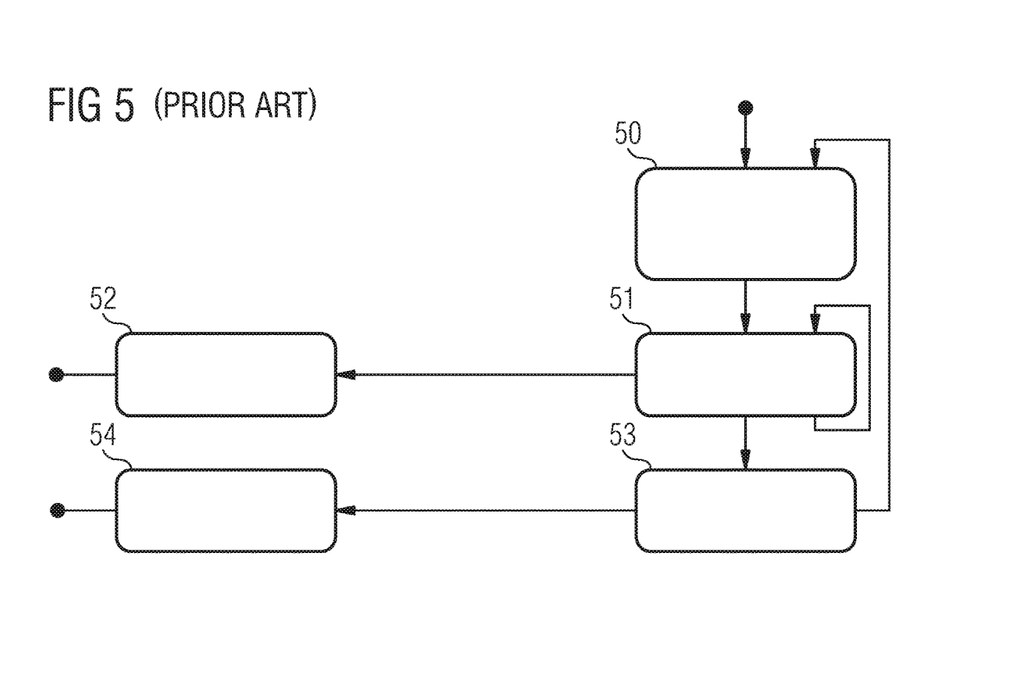
FIG. 5 shows a simplified flowchart of steps in an example iterative Monte Carlo path tracing algorithm.

The "three-dimensional" images 1 shown in FIGS. 2 and 4 are generated or rendered from a volume V for display on a screen or monitor. Light and shadow make the image appear three-dimensional. Different colours and transparency levels make it easy to differentiate between the different elements of the image, in this case different types of tissue (bone, blood vessel, muscle etc.) can be identified without difficulty. Monte Carlo path tracing is a technique widely used in 3D image rendering. FIG. 5 shows a simplified flowchart of steps in an example iterative Monte Carlo path tracing algorithm.

In a first block 50, a path is initialised, setting the direction of a path to be traced. The path direction is essentially random. The path itself can commence at an initial image plane, while a path portion can commence at a scatter event within the volume. In block 51, an increment is taken in the path direction. This path increment can either terminate outside the volume or inside the volume. If the path increment terminates outside the volume, the irradiance value is read from an irradiance map in block 52. If the path terminates inside the volume, there are two possibilities: a scatter event either takes place, or does not take place. When a path increment terminates in a scatter event, and the maximum number of scatter events has been reached, the path is deemed to be absorbed. When a path increment terminates in a scatter event, and the maximum number of scatter events has not been reached, the procedure commences again at block 50.

Figure 6:
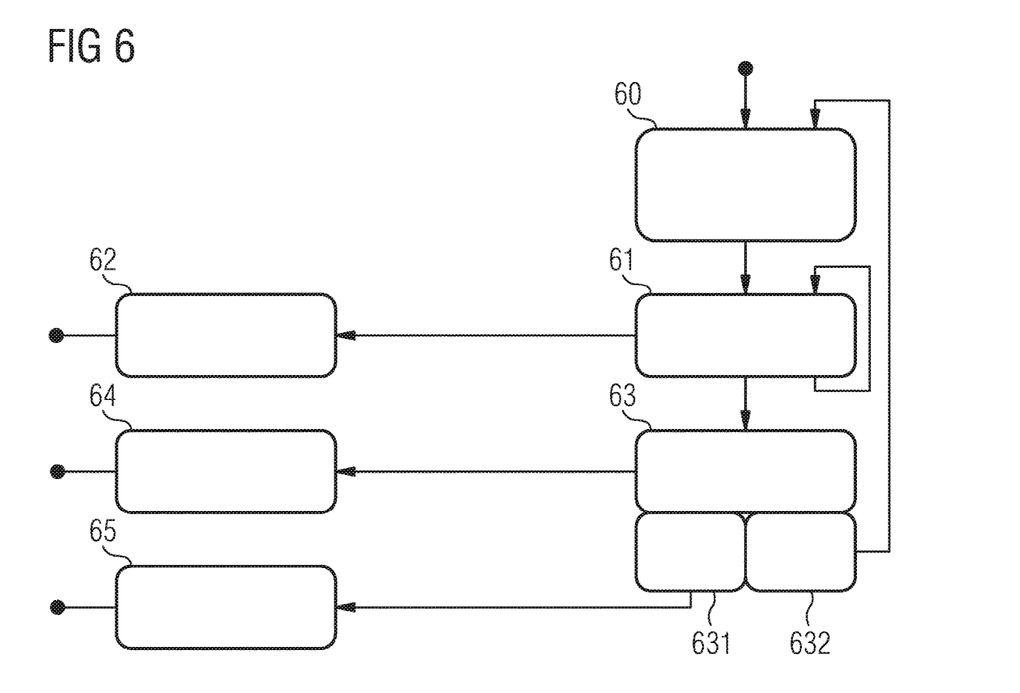
FIG. 6 shows a simplified flowchart illustrating steps in an iterative path tracing algorithm implemented in an embodiment of the inventive method.

FIG. 6 shows a simplified flowchart illustrating steps in an iterative path tracing algorithm implemented in an embodiment of the inventive method. Blocks 60, 61, 62, 64 are essentially similar to the corresponding blocks described in FIG. 5 above: in a first block 60, a path is initialised, setting the direction of a path to be traced. The path direction is essentially random. The path itself can commence at an initial image plane, while a path portion can commence at a scatter event within the volume. In block 61, an increment is taken in the path direction. This path increment can either terminate outside the volume or inside the volume.

If the path increment terminates outside the volume, the irradiance value is read from an irradiance map in block 62. If the path terminates inside the volume, there are three possibilities: a surface scatter event takes place; a volumetric scatter event takes place; no scatter event takes place. If no scatter event has taken place, another path increment is added in block 61.

If the path has terminated in a scatter event, block 63 determines whether the maximum number of scatter events has been reached, in which case the path is deemed to be absorbed in block 64. Otherwise, if the path has terminated in a surface scatter event, this is tagged in block 631, and the irradiance value for the corresponding voxel in the volume is read from the previously computer irradiance cache in block 65. If the path has terminated in volumetric scatter event, this is tagged in block 632, and the procedure continues at block 60 with a new portion of the path being traced.

Figure 7:
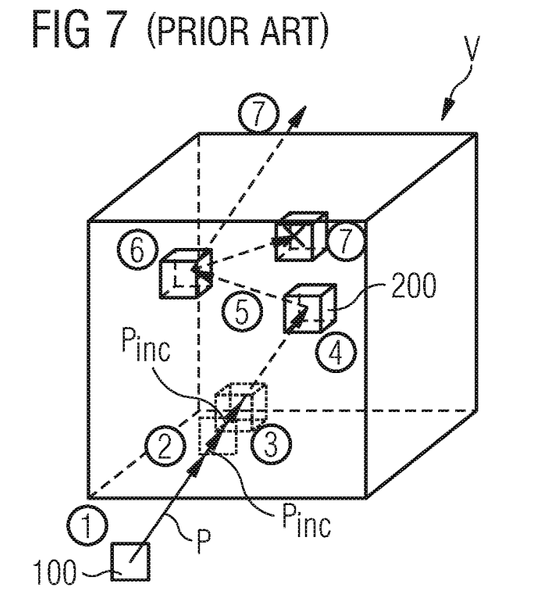
FIG. 7 illustrates an example path-tracing sequence during a prior art image rendering procedure.

FIG. 7 illustrates, in a very simplified manner, an example sequence of steps involved in tracing a path during a prior art image rendering procedure. The stages are numbered from 1 through 7 for clarity. At stage 1, a path P originates from a pixel 100 and is given a path direction according to the (virtual) camera settings. At step 2, the path intersects with the bounding box of the volume V. From this point onwards, the path P continues in path increments $P_{inc}$ with an appropriately chosen increment length. Stage 3 shows the path as it travels through a number of voxels (indicated by the dotted lines). The voxel transfer function of each voxel traversed by the path is consulted, and the alpha values of the voxels traversed by the path are accumulated.

At stage 4, the accumulated alpha values have exceeded a predefined threshold level, and a scatter event is deemed to have occurred at the current voxel. The colour and transparency of the voxel is noted, and will be used in deciding on the colour of the pixel 100 when rendering the 3D-image created from the volume V. A new (essentially random) path direction is set, and the process of iteratively extending the path begins again as indicated by stage 5.

Stage 6 indicates another scatter event. The colour of this voxel is multiplied with the colour of the voxel from stage 4. The path P can terminate inside the volume V or outside the volume V, as indicated by the two possible occurrences of stage 7. If the path terminates outside the volume V, a colour value is read from a surrounding illumination map and the colour is multiplied with the previously determined colour, and the result determines the colour of the pixel 100. If the path terminates inside the volume V after accumulation of predefined alpha-value threshold and after the maximum number of scatter events has been reached, the path is deemed to be absorbed, and the resulting pixel colour is black.

Figure 8:
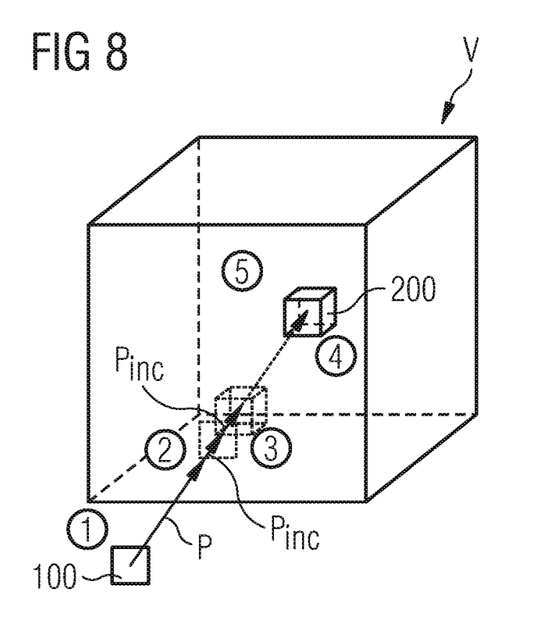
FIG. 8 illustrates an example path-tracing sequence during an embodiment of the inventive image rendering procedure.

In the same manner as FIG. 7, FIG. 8 illustrates an example sequence of steps involved in tracing a path during an embodiment of the inventive image rendering procedure. The stages are numbered from 1 through 5 for clarity. Stages 1-4 are the same as for FIG. 7 above, with a path P originating from a pixel 100, entering the volume V, and traveling through voxels in the volume V by path increments $P_{inc}$ until the accumulated alpha values have exceeded a predefined threshold level at stage 4. At this point, a surface scatter event is deemed to have occurred at the current voxel.

Instead of generating a new path segment and following its development, the irradiance cache is consulted, and the irradiance value for this voxel is read from the cache. The colour and transparency of the voxel at stage 4 is noted, and is used along with the irradiance value to give the colour of the pixel 100 when rendering the 3D-image created from the volume V. There is no need to follow the development of the path any further. Bearing in mind the huge number of paths that need to be traced in order to render an image with a sufficiently high level of graphic detail, the inventive approach can reduce the overall computational effort significantly while still making it possible to render a 3D image at a high level of detail during an interactive alteration of the viewing parameters.

Figure 9:
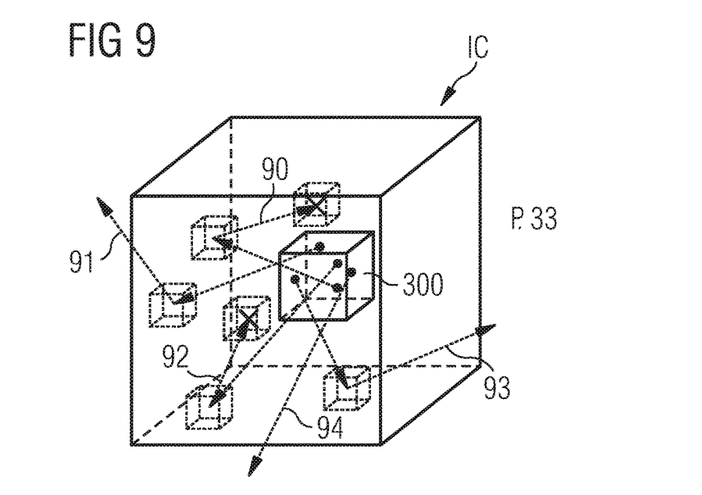
FIG. 9 illustrates an example sequence of steps in computing an irradiance cache IC for use in an embodiment of the inventive image rendering procedure.
Figure 10:
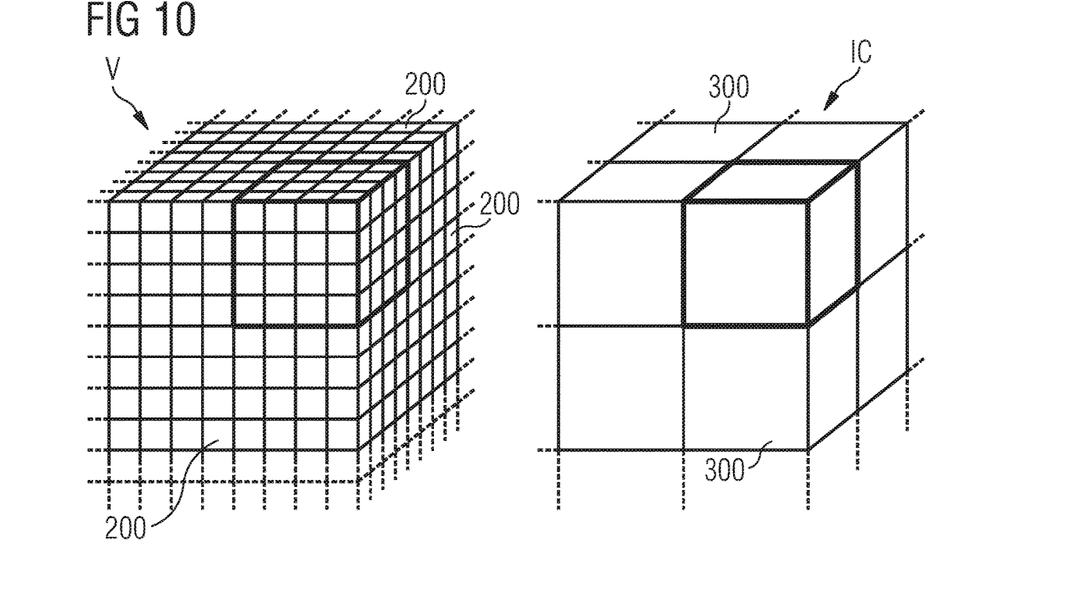
FIG. 10 illustrates a relationship between a data volume and an irradiance volume.

FIG. 9 illustrates an example sequence of steps involved in computing an irradiance cache IC for use in the inventive image rendering procedure. A cache voxel 300 is larger than a voxel 200 of the volume V for which the irradiance cache IC is being computed. This is illustrated in FIG. 10, which shows a volume V on the left-hand side, comprising a cube of voxels 200.

An irradiance cache IC is shown on the right-hand side of the diagram, with irradiance cache voxels 300. In this example, the 4×4×4 cube of voxels 200 in the volume V (outlined by the heavier line), is represented by the corresponding single irradiance cache voxel 300 also outlined by a heavier line. The irradiance value stored in one irradiance cache voxel 300 will therefore apply to each of the corresponding 64 voxels 200 of the volume V, for the case that a path terminates at any one of those voxels 200 in a scatter event during a path tracing procedure.

Returning to FIG. 9, it is noted that the volume V, the voxels 200 and the cache voxel 300 are not shown to scale in order to keep the diagram simple. While an irradiance cache could be computed using a relatively high maximum number of allowed scatter events, in this example embodiment, it is assumed that only two scatter events are permitted before the path is absorbed in the volume V. A plurality of paths 90, 91, 92, 93, 94 are traced, each path 90, 91, 92, 93, 94 originating at some point in the cache voxel 300 and travelling outward in a random direction. Some paths will leave the volume without scattering (indicated by path 94), some paths will leave the volume after a scatter event (indicated by paths 91, 93), and other paths will be absorbed in the volume after scattering (indicated by paths 90, 92). At each path termination, the colour is determined, and the colours resulting from each traced path are averaged to obtain an approximation of the indirect illumination at this voxel.

Figure 11:
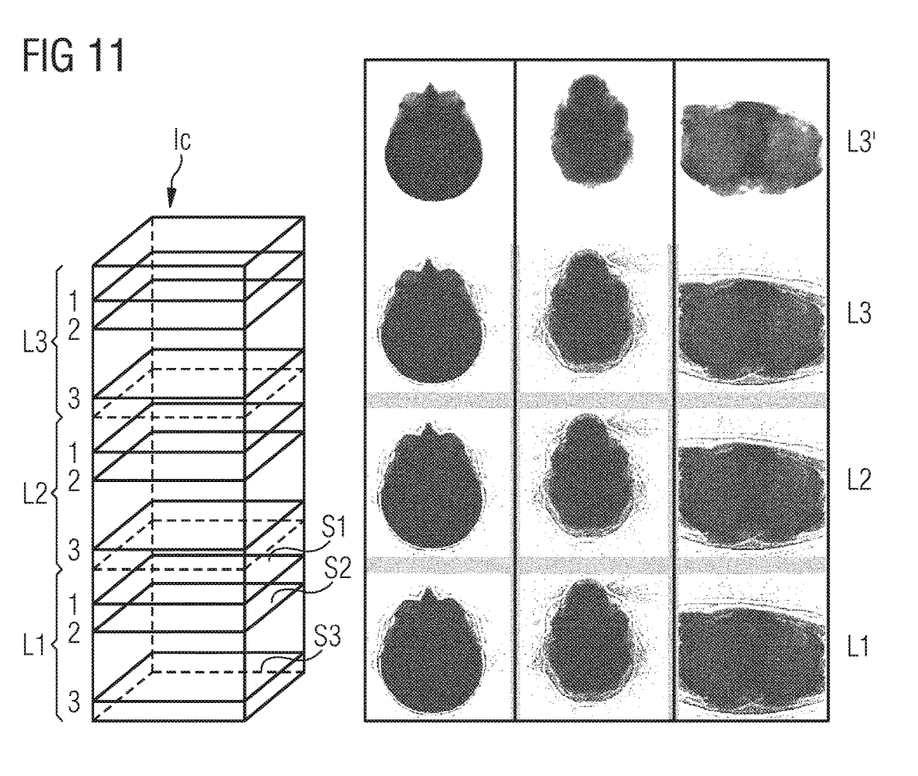
FIG. 11 shows different levels of a three-level irradiance cache.

As explained above, embodiments of the invention is based on the insight that the behaviour of a path after a surface scatter event can be regarded essentially independently of its behaviour prior to the surface scatter event. When a limit is placed on the number of possible scatter events for a path, knowledge about the point at which a surface scatter event occurs can be used to simplify computation of the irradiance volume. If the first scatter event is a surface scatter event, three scatter events remain and can contribute to the indirect illumination; if the second scatter event is a surface scatter event, two remaining scatter events can contribute to the indirect illumination, etc. FIG. 11 illustrates different levels L1-L3 of a three-level irradiance cache IC computed for a volume using a specific transfer function. Three "slices" S1-S3 relate to slices through the volume for which the irradiance cache is computed. In this example, a first "slice" S1 is taken through the head, a second "slice" S2 is taken through the lower head region, and the third "slice" S3 is taken through the thorax.

Each cache level L1-L3 is associated with a specific number of scatter events for a path after a surface scatter event, and for a maximum of four allowable scatter events (expressed as a path length of four). A limit of four has been found to be sufficient, since longer paths do not contribute significantly to the end result.

In this diagram, the irradiance cache IC is represented as a three-dimensional texture as shown on the left-hand-side of the diagram, indicating the three levels L1-L3. Level L3 provides irradiance information for the case that the first scatter event is a surface scatter event (three scatter events remain); Level L2 provides irradiance information for the case that the second scatter event is a surface scatter event (two scatter events remain); Level L1 provides irradiance information for the case that the third scatter event is a surface scatter event (one scatter event remains). The voxels of each cache level L1-L3 will have colour information (depending on the transfer function), and the colour of each irradiance cache voxel will be multiplied with the relevant colour during a surface scatter event in the image rendering stage. For the case that a surface scatter event corresponds to the fourth possible scatter event, the resulting pixel colour is black in any case. FIG. 11 only shows the cache levels in black and white, so that the colour information at the different cache levels L1-L3 cannot be seen.

The nature of the irradiance cache computation algorithm may result in a "rough" appearance of the rendered image. Therefore, the results can be filtered to obtain a smoother result as shown in level L3'. Filtering can involve application of a Gaussian filter, for example.

Figure 12:
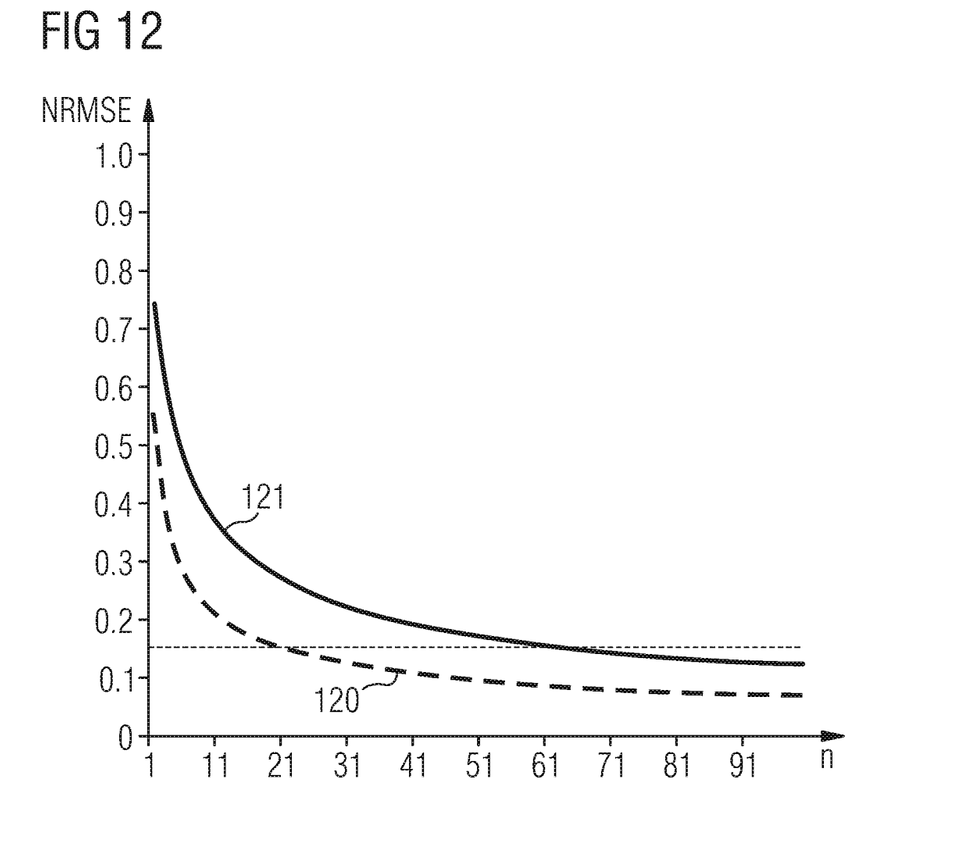
FIG. 12 shows a comparison of a known cinematic rendering procedure with the method according to an embodiment of the invention.

FIG. 12 shows a comparison of a known cinematic rendering procedure with the method according to an embodiment of the invention. The normalised root-mean-square error (NRMSE) is shown on the Y-axis, extending from 0-1, and indicating the level of difference between a reference image and the image being rendered. An image that closely matches the reference image will have a low NRMSE. An image that fails to match the reference image will have a high NRMSE. In this case, a satisfactory level of detail is deemed to have been achieved when the NRMSE converges to about 0.15. The iteration count is shown on the X-axis.

Graph 120 shows the development when rendering a 3D image using the inventive cinematic rendering procedure, and graph 121 shows the development when rendering the same 3D image from the same volume, using the known cinematic rendering procedure. The diagram shows that the known cinematic rendering procedure requires in the order of 60 iterations before a satisfactory level of detail is achieved, while an embodiment of the inventive method converges to an NRMSE less than the target 0.15 after only about 20 iterations. Furthermore, the NRMSE is already at a favourably low level of less than 0.4 even after only two or three iterations when the inventive method is used to render the image.

Although the present invention has been disclosed in the form of preferred embodiments and variations thereon, it will be understood that numerous additional modifications and variations could be made thereto without departing from the scope of the invention. For example, although an embodiment of the inventive method has been explained using an interactive rendering of a 3D medical image, the method can be used to render any kind of 3D image in which a high level of detail is desired during an interactive rendering or viewing process.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of visualizing a three-dimensional object from a data volume, the method comprising:
   obtaining a data volume representing at least one medical image;
   performing path tracing to compute an irradiance cache for the data volume;
   applying the irradiance cache during rendering of a three-dimensional image from the data volume, the irradiance cache including a plurality of levels and an irradiance cache level of the plurality of levels providing an irradiance contribution of paths with a specific number of remaining scatter events; and
   displaying the rendered three-dimensional image on a display device.

2. The method of claim 1, wherein the irradiance cache is computed prior to the rendering of the three-dimensional image from the data volume.

3. The method of claim 2, wherein the rendering of the three-dimensional image comprises applying an iterative path tracing algorithm to determine an irradiance value for each pixel of the rendered image.

4. The method of claim 2, wherein an irradiance cache value is computed only for a voxel whose gradient magnitude meets or exceeds a threshold.

5. The method of claim 2, wherein the resolution of the irradiance cache comprises at most one half of the resolution of the data volume.

6. The method of claim 2, wherein the irradiance cache is re-computed upon alteration of one or more of a global illumination parameter, a voxel alpha value parameter, and a voxel transfer function parameter.

7. The method of claim 2, wherein the data volume is obtained from one or more of an X-ray computer tomograph, a magnetic resonance imaging tomograph, a positron emission tomograph, a single-photon emission computed tomograph, and an ultrasound scanner.

8. A non-transitory computer memory including program elements to perform the method of claim 2 when the computer program is executed by a control unit of a computer, to render a three-dimensional image on a monitor connected to the computer.

9. A non-transitory computer-readable medium including stored program elements, readable and executable by a computer unit, which perform the method of claim 2 when the program elements are executed by the computer unit.

10. The method of claim 1, wherein the resolution of the irradiance cache comprises at most half of the resolution of the data volume.

11. The method of claim 10, wherein the resolution of the irradiance cache comprises at most one quarter of the resolution of the data volume.

12. The method of claim 1, further comprising filtering the irradiance cache.

13. The method of claim 1, wherein the irradiance cache is computed by performing path tracing through voxels of the data volume on the basis of volumetric scattering events.

14. The method of claim 1, further comprising determining a maximum number of allowable scatter events for a path traced through the volume, wherein a number of the plurality of irradiance cache levels is determined on the basis of a maximum number of allowable scatter events.

15. The method of claim 14, wherein the irradiance cache level is associated with the specific number of scatter events following a surface scatter event.

16. The method of claim 15, wherein the plurality of irradiance cache levels includes three levels, corresponding to a maximum of four allowable scatter events for a path traced through the volume.

17. The method of claim 14, wherein the plurality of irradiance cache levels includes three levels, corresponding to a maximum of four allowable scatter events for a path traced through the volume.

18. The method of claim 1, wherein the rendering of the three-dimensional image comprises applying an iterative path tracing algorithm to determine an irradiance value for each pixel of the rendered image.

19. The method of claim 1, wherein an irradiance cache value is computed only for a voxel whose gradient magnitude meets or exceeds a threshold.

20. The method of claim 1, wherein, during the image generation, the irradiance value of a voxel is read from the irradiance cache upon occurrence of a surface scattering event.

21. The method of claim 1, further comprising applying the irradiance cache to render a second three-dimensional image from the data volume for one or more of an altered viewpoint, an altered zoom factor, and an altered camera angle.

22. The method of claim 1, wherein the irradiance cache is re-computed upon alteration of one or more of a global illumination parameter, a voxel alpha value parameter, and a voxel transfer function parameter.

23. The method of claim 1, wherein the data volume is obtained from one or more of an X-ray computer tomograph, a magnetic resonance imaging tomograph, a positron emission tomograph, a single-photon emission computed tomograph, and an ultrasound scanner.

24. The method of claim 1, further comprising refining the irradiance cache between iterations of the image rendering procedure.

25. A non-transitory computer memory including program elements to perform the method of claim 1 when the computer program is executed by a control unit of a computer, to render a three-dimensional image on a monitor connected to the computer.

26. A non-transitory computer-readable medium including stored program elements, readable and executable by a computer unit, which perform the method of claim 1 when the program elements are executed by the computer unit.

27. An imaging system comprising:
an irradiance cache computation stage to perform path tracing to compute an irradiance cache for a data volume;
a rendering stage to apply the irradiance cache during a rendering of a three-dimensional image from the data volume, the irradiance cache computation stage being realized to compute an irradiance cache comprising a plurality of levels, wherein an irradiance cache level of the plurality of levels provides an irradiance contribution of paths with a specific number of remaining scatter events; and
a displaying stage to display the rendered three-dimensional image on a display device.

28. The imaging system of claim 27, further comprising a first compute-shader, adapted to trace a path from each voxel block of the data volume to estimate a colour value for each entry of the irradiance cache.

29. The imaging system of claim 28, further comprising a second compute-shader, adapted to adjust an interim result of the irradiance volume computation module by the result of the first compute-shader.

30. The imaging system of claim 27, further comprising a second compute-shader, adapted to adjust an interim result of the irradiance volume computation module by the result of the first compute-shader.

31. An imaging system comprising:
a memory storing computer-readable instructions; and
one or more processors configured to execute the computer-readable instructions such that the one or more processors are configured to
perform path tracing to compute an irradiance cache for the data volume,
apply the irradiance cache during rendering of a three-dimensional image from the data volume, the irradiance cache including a plurality of levels and an irradiance cache level of the plurality of levels providing an irradiance contribution of paths with a specific number of remaining scatter events; and
display the rendered three-dimensional image on a display device.

32. The imaging system of claim 31, wherein the one or more processors are further configured to trace a path from each voxel block of the data volume to estimate a colour value for each entry of the irradiance cache.

33. The imaging system of claim 32, wherein the one or more processors are further configured to adjust an interim result of the irradiance volume computation module by the result of the tracing of the path from each voxel block of the data volume.

* * * * *